United States Patent [19]

Lefaucheux et al.

[11] 4,450,716
[45] May 29, 1984

[54] PROCESS AND DEVICE FOR MEASURING THE PRESSURE OF TIRES, PARTICULARLY FOR AIRCRAFT

[75] Inventors: Jean-Louis J. R. Lefaucheux, Paris; Claude Martin, Plaisir; Edmond E. A. Mokrani, Sceaux, all of France

[73] Assignee: Societe Anonyme de Telecommunications, France

[21] Appl. No.: 274,636

[22] Filed: Jun. 17, 1981

[30] Foreign Application Priority Data

Jun. 19, 1980 [FR] France .................................. 80 13579

[51] Int. Cl.³ ........................ B60C 23/00; G08G 1/12
[52] U.S. Cl. ..................................... 73/146.5; 340/58; 336/30
[58] Field of Search ....................... 73/146.4, 718, 708, 73/724, 753, 146.5; 340/58; 331/65; 336/30

[56] References Cited

U.S. PATENT DOCUMENTS

| | | | |
|---|---|---|---|
| 4,064,482 | 12/1977 | Maisch et al. | 340/58 |
| 4,283,707 | 8/1981 | Church | 73/146.5 |
| 4,334,428 | 6/1982 | Fima | 73/146.5 |

*Primary Examiner*—Donald O. Woodiel
*Attorney, Agent, or Firm*—Jacobs & Jacobs

[57] ABSTRACT

A device for measuring the pressure of tires, particularly for aircraft, comprising a passive sensor adapted linearly to convert a variation in pressure into an electrical information variation, in situ, means adapted to convey the electrical information from the sensor to the cockpit of said aircraft, a self-oscillator whose oscillation frequency is controlled by the value of said electrical information from the sensor and means adapted to convert the signal issuing from said self-oscillator into a D.C. voltage proportional to a frequency variation, said frequency variation being proportional to said variation in pressure, characterized in that the electrical information from the sensor, before transmission into the cockpit, is applied to the terminals of the primary winding of a high frequency transformer, said primary winding being mechanically fast with the wheel, the secondary winding of said transformer being concentric with respect to the primary winding and mechanically fast with the stationary part of the landing gear, the ratio n of transformation between the primary winding and the secondary winding modifying the electrical information from the sensor according to the square of said ratio n.

3 Claims, 5 Drawing Figures

PROCESS AND DEVICE FOR MEASURING THE PRESSURE OF TIRES, PARTICULARLY FOR AIRCRAFT

The present invention relates to a device for measuring the air pressure in the tyres of the wheels of an aircraft, and for displaying the measurement in the cockpit.

Aircraft tyres can lose about 5% of their pressure daily, due to porosity or other factors. It is therefore recommended to check the pressure of all the tyres of an aircraft. Moreover the load coefficient of commercial aircraft is frequently high, with the result that the mass supported by each tyre is often close to the maximum limit allowed. Under these conditions, a deflated tyre imposes an additional load on its homologue disposed on the same axis, which may provoke failure thereof.

Systems for measuring the pressure of aircraft tyres are already known. The pressure information is generally furnished by a pressure sensor disposed at the location of the air valve on the rim of the wheel. This pressure sensor may be constituted by resistive or piezoresistive gauges mounted as a Wheatstone bridge and delivering an electric signal as a function of the measure measured, on condition that an exciting voltage be furnished to the bridge. This electric signal is usually amplified and processed by electrical circuits housed in the wheel of the aircraft and transmitted to the cockpit where the electrical magnitude is analysed then processed by means of a computer sub-assembly.

This computer generally receives the electric signals coming from all the aircraft wheels and transmits to an indicator such as a cathode-ray tube or measuring apparatus the values of the absolute or differential pressures measured. Such systems necessitate the insertion of extremely fragile, active electronic elements such as transistors, rectifiers, etc . . . inside each aircraft wheel, these elements being subjected therein to variations in temperature ranging from 40° C. to 150° C. Such systems also necessitate the insertion of an exciting circuit, involving a multiplication of the electrical links between the cockpit and the wheel of the aircraft. These systems are also subjected to considerable mechanical stresses as shocks, intense accelerations upon take-off and landing. Such systems generally allow the pressure to be read in the cockpit to enable the pressure to be monitored at any instant, prior to landing for example, this requiring new electrical links up to the cockpit.

It is an object of the present invention to overcome the short-comings of the known measuring systems and to monitor the pressure of the tyres by remote control, by visual indication in the cockpit, at any instant both when stopped and during taxiing, a loss of pressure not being excluded at that moment.

The present invention is based on the fact that it is also known, particularly by French Pat. Nos. 2 266 879 and 1 411 017, to use a capacitive pressure sensor adapted to make a transistor oscillate at a frequency which is a function of the value of the capacity of the sensor, and to convert the signal from the transistor-oscillator into a voltage representative of the desired pressure information.

From such a device, with which it is already unnecessary to have a separate exciting circuit at wheel level, the pressure information being acquired by passive means, the present invention envisages that only robust detection members be disposed outside the cell of the aircraft and be suggested to the harsh climatic environment (temperature, hygrometry, etc . . . ) and to mechanical stress (shocks, accelerations, . . . ) existing at aircraft wheel level when landing or taking off.

It is also an object of the invention to eliminate all rubbing contacts of the prior art such as rubbing brushes on conducting tracks which are relatively unreliable, having regard to the environment, and subjected to wear or severe fouling.

It is also an object of the invention to eliminate the influence of the temperature in the read-out of the pressure measurement.

To this end, the present invention relates to a device for measuring the pressure of tyres, particularly for aircraft, comprising a passive sensor adapted to linearly convert a variation in pressure into a variation in electrical information, in situ, means adapted to convey the electrical information from the sensor to the cockpit of said aircraft, a self-oscillator whose oscillation frequency is controlled by the value of said electrical information from the sensor and means adapted to convert the signal issuing from said self-oscillator into a D.C. voltage proportional to a frequency variation, said frequency variation being proportional to said pressure variation, wherein the electrical information from the sensor, before transmission into the cockpit, is applied to the terminals of the primary winding a a high frequency transformer, said primary winding being mechanically fast with the wheel, the secondary winding of said transformer being concentric with respect to the primary winding and mechanically fast with the fixed part of the landing gear, the ratio n of transformation between the primary winding and the secondary winding modifying the electrical information from the sensor according to the square of said ratio n.

In addition, the absolute pressures obtained for each wheel may be compared two by two, first means furnishing a signal when the absolute pressure of the first wheel is less than that of the second.

The signal issuing from said self-oscillator may advantageously serve as reference oscillator, for a second oscillator servo-controlled in phase and in frequency, the voltage of said second oscillator being controlled by the signal issuing from a phase comparator, said phase comparator being excited by the signals issuing from said first and second oscillators.

The high frequency transformer of the invention may preferably comprise two concentric windings, one being stationary, the other rotating about the axis of the first, said windings being maintained by means of quasi-cylindrical shells made of non-magnetic material, the mobile shell being maintained in contact against the stationary shell by bearing means, said shells having a very low inertia, electric wires connected to the terminals of said windings transmitting a signal having a ratio N of transformation indicative of the ratio N of said windings.

The invention will be more readily understood on reading the following description with reference to the accompanying drawings, in which.

Figure 1:
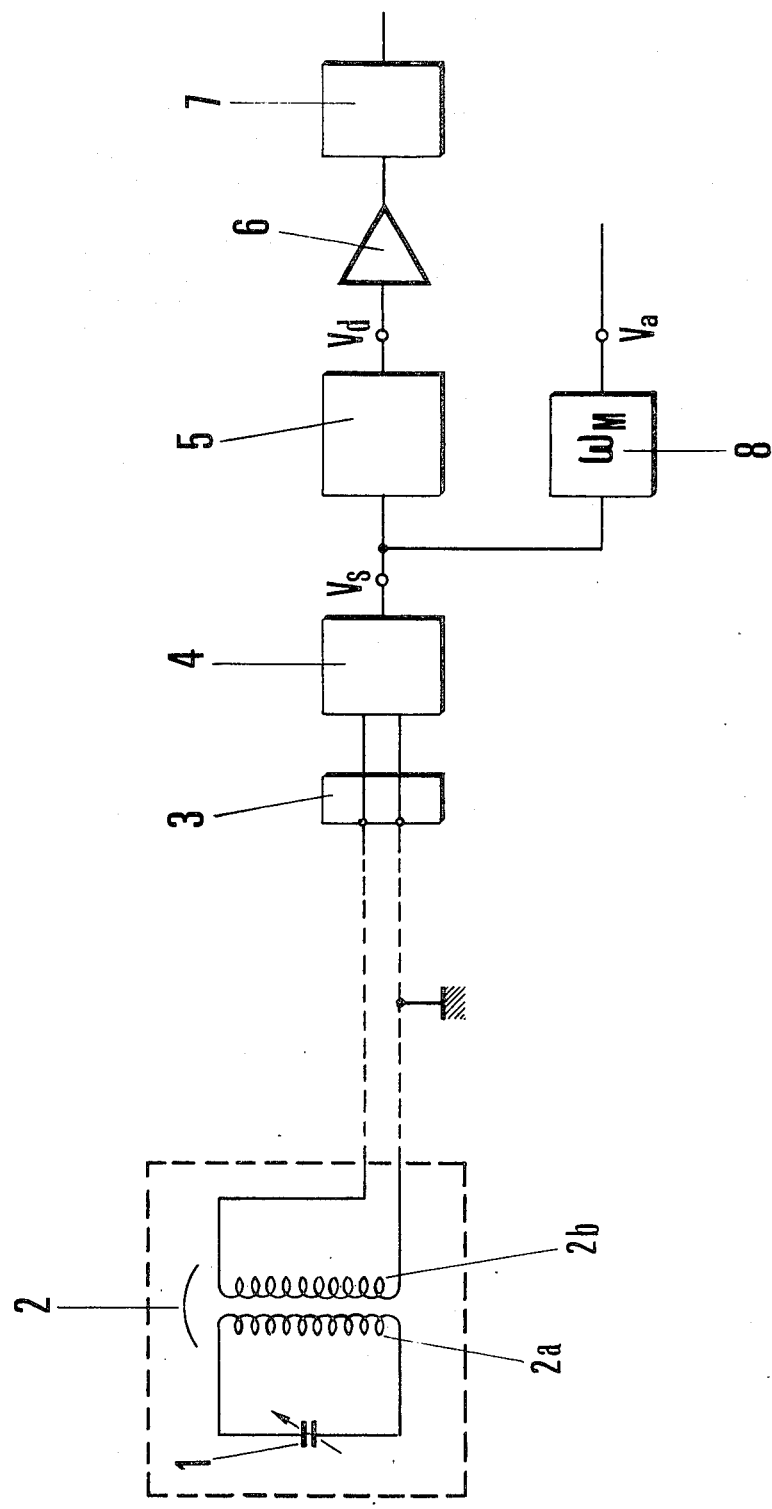
FIG. 1 is a block diagram of the system of the invention.

Referring now to the drawings, FIG. 1 diagrammatically shows the pressure measuring device, distinguishing the part inserted in the wheel of the aircraft and the part disposed in the cockpit.

A passive pressure sensor 1 disposed on the air valve of the wheel, in the present case a capacitive sensor, furnishes electrical information, therefore capacity information, having a high value and proportional to the pressure measured.

Such a pressure sensor 1 may for example be the one described in Luxemburg Pat. No. 80 857. This pressure sensor 1 must measure nominal pressures of the order of 5 bars to 25 bars, the nominal pressures being of the order of 8 to 10 bars for the wheels of the nose gear and from 10 to 15 bars for the wheels of the main landing gear, depending on the types of aircraft.

Such a sensor must advantageously be insensitive to the effects of acceleration and to those of temperature. The capacity information, connected linearly to the pressure information, is applied to the terminals of the primary winding $2a$ of a high frequency transformer 2.

The primary winding $2a$ of this transformer is mechanically fast with the wheel of the aircraft and rotates therewith.

A secondary winding $2b$, concentric with respect to the primary winding $2a$, receives the capacity information virtually without loss, the magnitudes of the windings being advantageously chosen.

In fact, if n is the ratio of the number of turns between the primary winding $2a$ and the second winding $2b$, the magnitude of the capacity $C_{2b}$, at the terminals of the secondary winding $2b$, is modified according to the square of the ratio n of transformation of the windings $$C_{2b} = n^2 C_1$$

where $C_1$ is the capacity measured at the terminals of the sensor 1.

The secondary winding $2b$ is advantageously mechanically fixed according to the invention and is carried by the stationary part of the landing gear.

Figure 2:
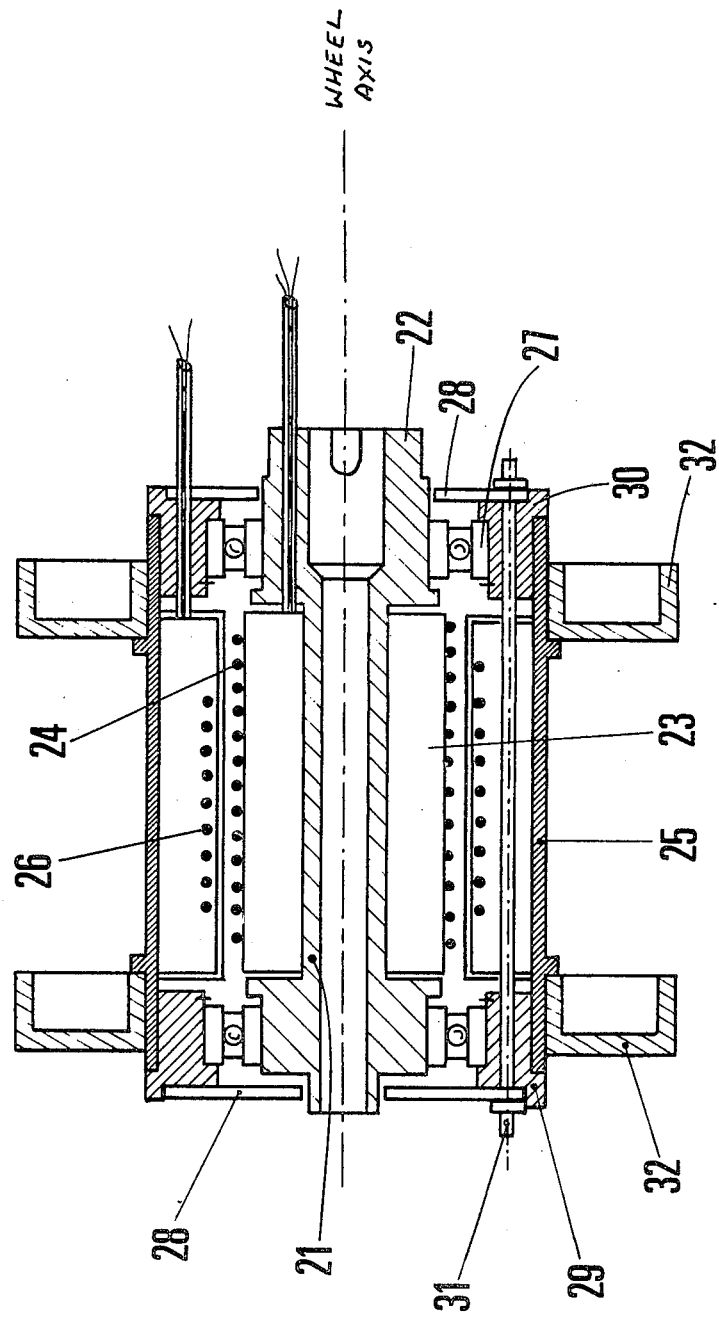
FIG. 2 is a detailed view of the high frequency transformer of FIG. 1.

FIG. 2 illustrates the transformer 2 of the invention.

The rotor 21, machined in a non-magnetic material, is fast with the wheel. This rotor 21 is roughly in the form of a low-inertia cylinder, provided with protuberances 22 at the two ends and sheathed with an insulating shell 23 between these two protuberances 22. This insulating shell 23 receives the winding 24 constituting the primary winding $2a$ of the transformer. This winding 24 is advantageously impregnated with a varnish resistant to a temperature of 200° C. Around this primary winding $2a$, constituted by the rotor 21, the shell 23 and the winding 24, is disposed a secondary winding $2b$ essentially constituted by a tubular body 25 likewise made of non-magnetic material, constituting the outer insulating shell. The tubular body 25 internally supports the winding 26 of the stationary part of the transformer 2. This winding is also impregnated with a varnish resistant to the temperature of 200° C. The two windings 24 and 26 are consequently located opposite and at a short distance from each other, separated by small air space, winding 24 being mobile, but always maintained inside the other. In fact, the mobile part $2a$ of the transformer 2, or rotor, rotates on bearings 27 disposed between the protuberances 22 of the rotor and the tubular body 25 of the stator on either side of the windings 24 and 26. Two Teflon side pieces 28, lubricated by a silicon grease, close the housing of the bearings 27 and provide therefore an additional environmental protection. The silicon grease is advantageously chosen for its resistance in the temperature range of between $-55°$ C. and $+200°$ C.

These side pieces 28 abut on the edges of the tubular body 25 of the secondary winding $2b$ against which they are maintained due to two rings 29 and 30 likewise made of non-magnetic material. Moreover, two tie rods 31, also made of non-magnetic material, passing right through the stationary part $2b$ parallel to the axis of the transformer 2, enable the elements 25, 27, 28, 29, 30 constituting this stationary part $2b$ to be solidly fastened.

Two webs or circular pieces 32, fixed on the outer part of the tubular body 25 ensure centuring of the stationary $2b$ of the transformer 2 in the axis of the wheel and in the axis of the mobile part $2a$ of this transformer.

The electrical winding 26 of the secondary winding $2b$ is connected by means of a cable to the cockpit. The electrical winding 24 of the primary winding $2a$, also stationary with respect to the wheel, since it rotates with the sensor 1, avoids any rotating electrical contact.

The capacities measured by the sensor are usually of the order of 100 to 700 picofarads, and the rotating high frequency transformer 2 of the invention may be made with the windings 24 and 26 disposed in the air without necessitating an additional magnetic coupling circuit as will be seen hereinafter. Such a simplification facilitates adaptation of the system of the invention to very different embodiments to equip very different wheels. Such a system is also insensitive to variations in heat, like any magnetic coupling, and does not require too strict a centering of the primary and secondary windings 24 and 26. Finally, such a system is inexpensive to manufacture.

The capacity variation information furnished by the sensor 1, then transmitted by the high frequency transformer 2, is conveyed by means of a cable, for example a shielded pair towards the cockpit or the cell of the aircraft.

In the cockpit, the cable is connected to the input of an oscillator 4.

Figure 3:
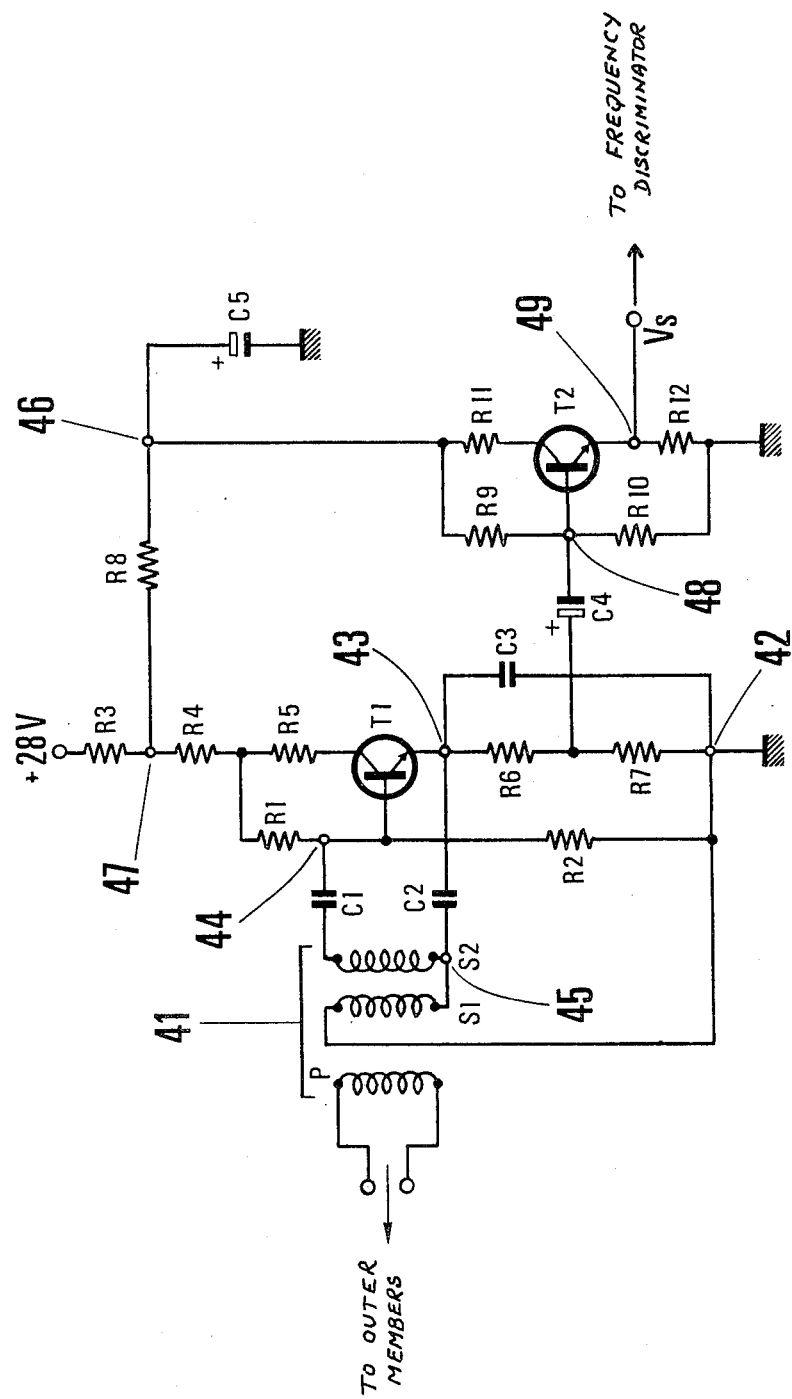
FIG. 3 is a schematic diagram of the oscillator of FIG. 1.

The oscillator 4 is a self-oscillator whose oscillation frequency is a function of the passive capacity information which is transmitted thereto. FIG. 3 illustrates the characteristics of this oscillator 4 of the invention. This oscillator 4 is essentially composed of a transformer 41 formed by a primary winding P and two secondary windings $S_1$ and $S_2$ coupled together. A transistor $T_1$ mounted as a self-oscillator furnishes a frequency controlled by the secondary windings $S_1$ and $S_2$. In fact, the collector of the transistor $T_1$ is taken to voltage $+28$ volts via resistors $R_3$, $R_4$ and $R_5$, designated in order from the potential, placed in series.

The emitter of the transistor $T_1$ is taken to earth at a point 42 via the resistors $R_6$ and $R_7$, also in series. Between the base of the transistor $T_1$ and the same point 42, taken to earth, is placed a resistor $R_2$. At the point of connection of the resistors $R_4$ and $R_5$ is inserted a resistor $R_1$ of which the other terminal is connected to the base of the transistor $T_1$.

Two capacitors $C_1$ and $C_2$ are inserted at the terminals of the secondary winding $S_2$ of the transformer 41. The capacitor $C_1$ is connected, on the one hand, to a point 44 placed between the resistor $R_1$ and the base of the transistor $T_1$ and, on the other hand, to one end of the winding $S_2$.

The other end of the winding $S_2$ is connected to a terminal 45 of the capacitor $C_2$. The other terminal of the capacitor $C_2$ is connected at a point 43 located between the emitter of the transistor $T_1$ and the resistor $R_6$. The other secondary winding $S_1$ is connected, on the one hand, to the capacitor $C_2$ at the same point 45 of connection as the winding $S_2$ and, on the other hand, to point 42 taken to earth.

Another capacitor $C_3$ is placed in parallel with the resistors $R_6$ and $R_7$ between points 42 and 43.

A second transistor $T_2$ is mounted as an impedance match. The base of this transistor $T_2$ is connected via a capacitor $C_4$ to a point located between the resistors $R_6$ and $R_7$.

Between a point 46 and the collector of the transistor $T_2$ is placed a resistor $R_{11}$.

This point 46 is connected, on the one hand, to earth via a capacitor $C_5$ and, on the other hand, to point 47 placed between the resistors $R_3$ and $R_4$ via a resistor $R_8$.

A resistor $R_{12}$ is inserted between the earth and the emitter of the transistor $T_2$. A resistor $R_9$ is inserted, on the one hand, between the point 46 and the resistor $R_{11}$ and, on the other hand, at point 48 located between the capacitor $C_4$ and the base of the transistor $T_2$.

At this same latter point 48 is placed a resistor $R_{10}$ of which the other branch is connected at a point located between the earth and the resistor $R_{12}$. The output signal $V_s$ is furnished at a point 49 placed at the output of the emitter of the transistor $T_2$.

The transistor $T_2$ mounted as impedance match transmits a signal $V_s$ carrying the frequency information.

The signal $V_s$ is linked to the frequency information by a relation of the type:

$$V_s(t) = E_s \sin \omega_s t$$

in which the frequency $\omega_s$ is connected to frequency $f_s$ by the relation $\omega_s = 2\pi f_s$.

The oscillator 4, carrying the pressure information in the form of a frequency variation, may be assimilated to a frequency modulator as will be seen hereinafter.

The functioning of the oscillator 4 is deduced from that of the transistors $T_1$ and $T_2$. The resistors supply the two transistors $T_1$ and $T_2$ with direct current. These two transistors function in class A, their base being taken to positive potential with respect to their respective emitter, via resistive bridges constituted by resistors $R_1$ and $R_2$ for $T_1$, and $R_9$ and $R_{10}$ for $T_2$.

The capacitor $C_3$ decouples the emitter of $T_1$ at high frequencies higher than the range of operational frequencies. For the latter, the impedance presented by $C_3$ is therefore high.

The capacitors $C_1$ and $C_2$ respectively insulate in direct current the base and the emitter of the transistor $T_1$ of the matched winding $S_2$ of the sinusoidal oscillator at parallel resonance. The impedance of these capacitors $C_1$ and $C_2$ is therefore weak for the operational frequencies.

The resonant circuit of the oscillator 4 is constituted by the secondary windings $S_1$ and $S_2$ disposed in series and the fictitious capacitor corresponding to the capacitor 1 returned by the primary winding P of the transformer 41. The capacity of this fictitious capacitor is particularly a function of the value of that of the capacitive sensor 1, of the ratio of transformation of the transformer 2 and the transformer 41 as well as of the parasitic capacity of the connecting cable between the stationary part of the wheel of the aircraft and the input P of the transformer 41.

From the standpoint of high frequency, the parallel resonant circuit is therefore disposed between the base of the transistor $T_1$ (point 44) and its earth, the coupling point 45 being connected to the emitter. The winding $S_2$ ensures reaction between the emitter and the base of the transistor $T_1$ and provokes self-oscillation thereof.

The frequency of this oscillation depends on the value of the various constituent components and the variation in frequency, carrying the pressure information, depends only on the variation in capacity of the pressure sensor 1 insofar as the other elements are stable. Now, the extreme range of significant frequencies is sufficiently reduced for the variation of the frequency of the signal $V_s$ obtained at the output of the oscillator 4 as a function of the capacity of the sensor 1 to be considered as linear, to within about ±1%. As a sensor 1 will be chosen whose variation in capacity as a function of the pressure is also linear in the range of useful pressures, the signal $V_s$ carries a frequency information $2\pi\omega_s$ which is a linear function of the variation in pressure of the tyre in question.

Figure 4:
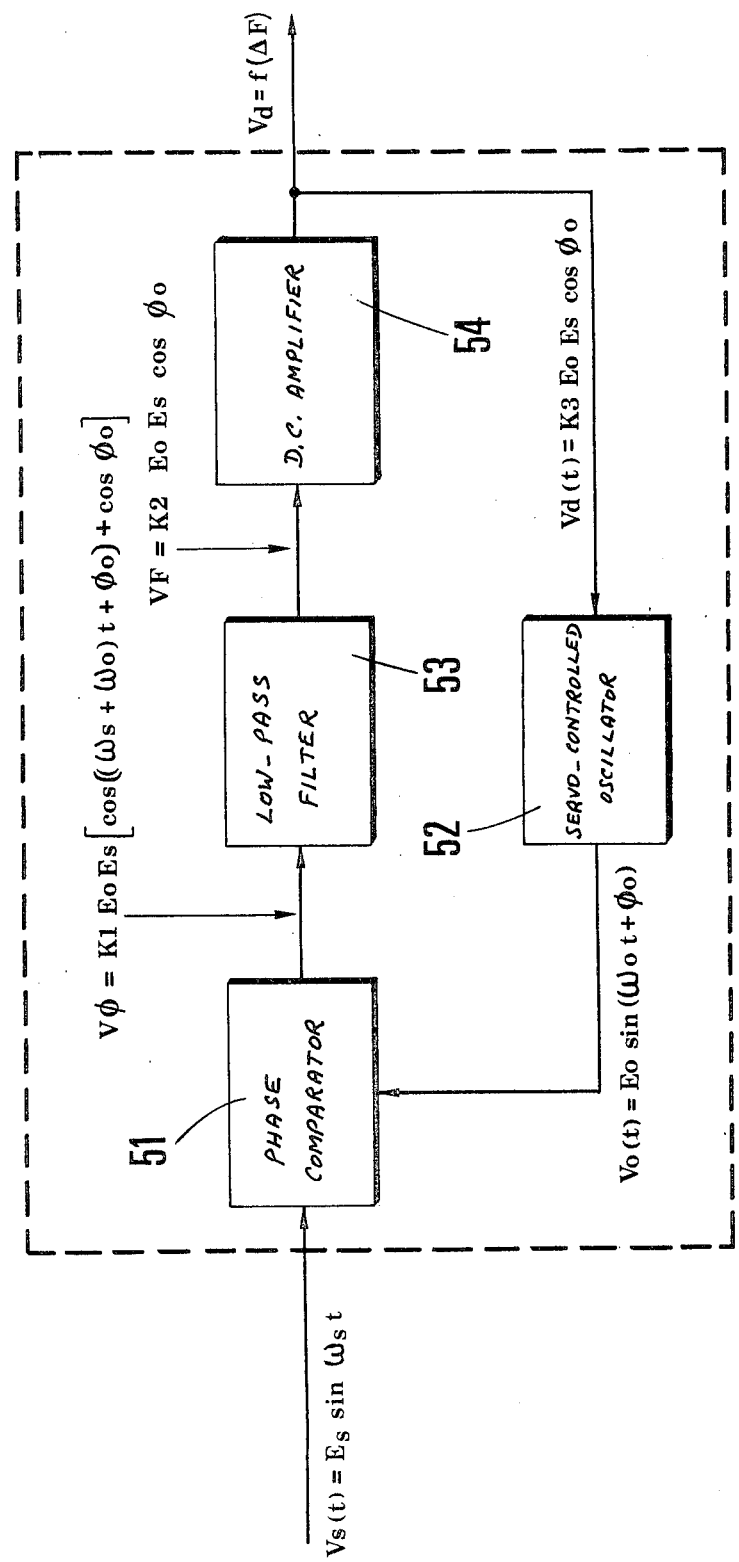
FIG. 4 is a view of the frequency discriminator of FIG. 1.

The signal $V_s$ issuing from the oscillator 4 controlled by the capacity information, is applied to the input of a frequency discriminator 5. The frequency discriminator is shown in detail in FIG. 4. Discriminators of this type are already known. A phase comparator 51 receives the signal $V_s$ furnished by the device 4 and compares this signal with the one furnished by a servo-controlled oscillator 52. The voltage of this oscillator 52 is controlled and it furnishes a signal of frequency $\omega_o$, with the exception of a $2\pi$ coefficient ($\omega_o = 2\pi f_o$), written:

$$V_o(t) = E_o \sin(\omega_o t + \phi_o)$$

in which $\phi_o$ is a locking phase, i.e. the initial phase of the signal $V_s(t)$ when the signals $V_o(t)$ and $V_s(t)$ have the same frequency. The phase comparator 51 produces at its output a voltage $V\phi$ proportional to the phase difference of the signals $V_s(t)$ and $V_o(t)$. The signal $V\phi$ is written:

$$K_1 E_o E_s [\cos(\omega_s + \omega_o)t + \phi_o) + \cos \phi_o]$$

in which $K_1$ is a constant.

A low pass filter 53 enables the parasitic high frequency signal present in signal $V\phi$ to be eliminated. A signal is thus obtained, written:

$$V_f = K_2 E_o E_s \cos \phi_o$$

in which $K_2$ is a constant.

The signal $V_f$ issuing from the filter 53 is applied to the input of a D.C. amplifier 54 which furnishes at its output a signal $V_d(t)$, written:

$$V_d(t) = K_3 E_o E_s \cos \phi_o$$

where $K_3$ is a constant.

This amplifier 54 amplifies the error voltage. The output signal $V_d(t)$ is applied to the input of the servo-controlled oscillator 52 which is thus inserted in the return loop in order to furnish the control voltage of the frequency of this oscillator 52. This loop thus acts as a proportional phase controller and in the case of there being locking, the phase error $\phi_i - \phi_o$ is a function of the gain of the open loop. As the phase is the integral of the frequency, the loop may also be considered as an integral frequency controller, not involving any frequency variation when there is locking, i.e. when the two oscillators are servo-controlled in frequency.

It is thus possible to transmit a control voltage to the oscillator 52 through the filter 53 of much reduced pass band, of the order of a few hertz.

The oscillator-frequency modulator device 4, carrying the pressure information in the form of a frequency variation, acts, according to the invention, as reference oscillator with respect to the servo-controlled oscillator 52.

The frequency variation obtained at the output of the amplifier 54 is furnished in the form of a voltage $V_d$ representing the D.C. component function of the phase difference between the two compared signals.

This detection has various advantages:

The low pass filter 53 may have a very low cut-off frequency, thus reducing the detection noise band and contributing to eliminating the parasitic signals and untimely alerts.

In addition, a range of operation of the controlled-voltage oscillator 52 is chosen according to the invention in a region where its voltage characteristic as a function of the frequency is virtually linear.

Let us assume that the sensor 1 detects a pressure which is translated by a frequency $\omega_M/2\pi$ at the level of the so-called reference oscillator 4; the signal $\theta_i$ applied to the input of the phase detector 5 is written:

$$\theta_i = \int (\omega_c + \Delta\omega \cos \omega_M t) dt$$

where $\omega_c/2\pi$ is the rest frequency.

Let us assume that the loop gain is sufficiently high for $\theta_i$ to be close to $\theta_o$ signal delivered by the servo-controlled oscillator 52 when it presents the same frequency as the reference oscillator 4.

The frequency delivered by the oscillator 52 is given by $\omega_o = \omega_c + \Delta\omega \cos \omega_M t$, with the exception of a $2\pi$ coefficient.

Since the oscillator 52 presents a linear transfer function in the operation range of the invention:

$$\omega_o = K_o V_d$$

and $$V_d = (\omega_c/K_o) + (\Delta\omega/K_o) \cos \omega_M t$$

The output voltage $V_d$ of the phase comparator device 5 is therefore represented by the modulation signal $\cos \omega_M t$ to which a D.C. component $\omega_c/K_o$ is added.

As the useful signal $V_d$ is taken after treatment by the narrow band filter 53, the parasitic signals detected are eliminated. An amplifier 6 receives the useful signal $V_d$ and furnishes a signal at the input of a computer 7.

The detection system thus described is associated with each aircraft wheel. However, the computer 7 is common to all the wheels of the aircraft.

Lt us assume that the aircraft in question is of the AIRBUS type. In this case, the 10 wheels of the aircraft are each provided with a sensor $1_i$ and with a transformer $2_i$ furnishing a signal $V_{di}$ indicative of the information from the corresponding wheel and linearly connected to the pressure $P_i$ of its tyre, this being written in the following form:

$$V_{di} = kp_i$$

in which k is a constant.

Figure 5:
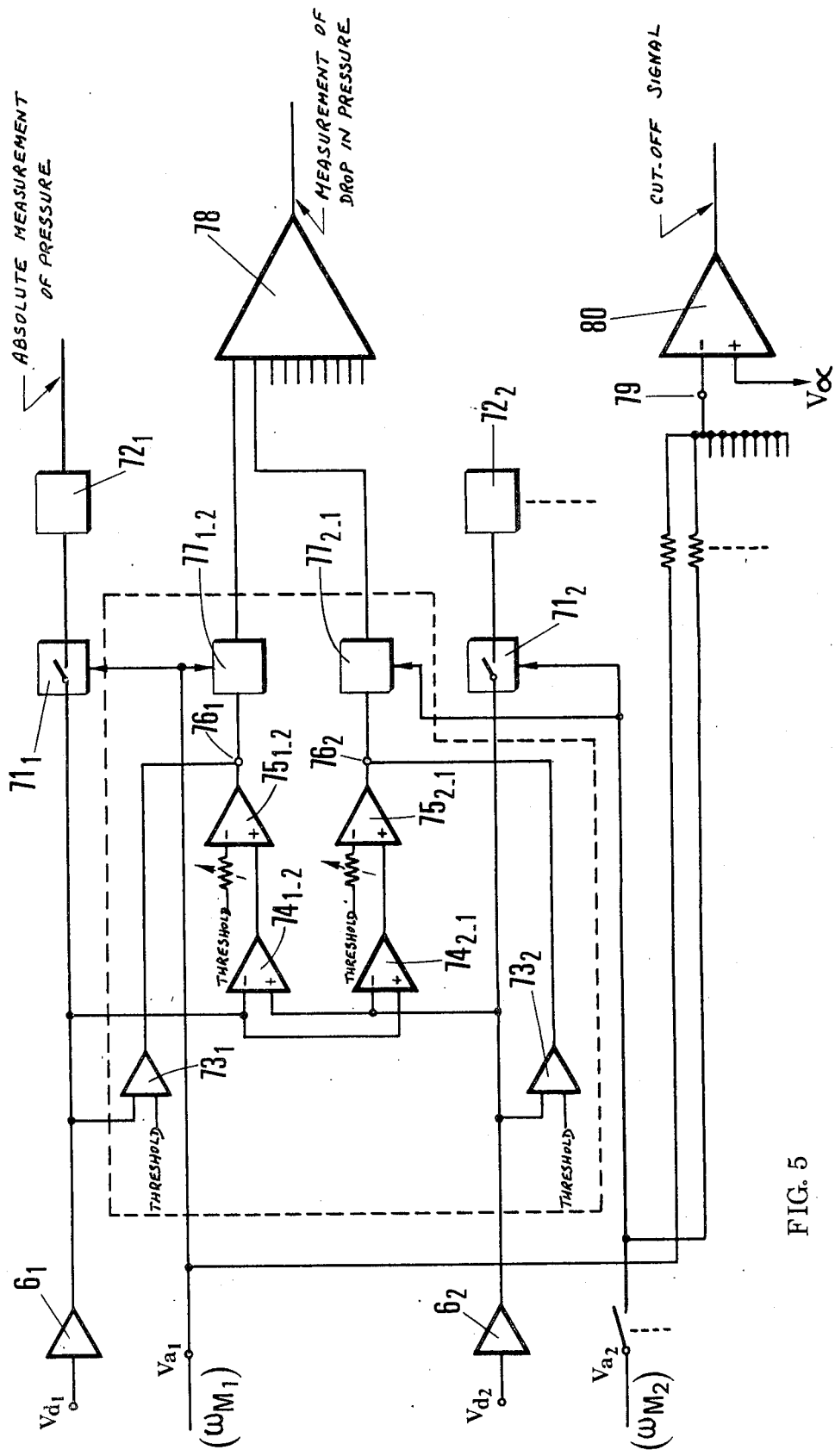
FIG. 5 is a preferred embodiment of the device of the invention.

With reference to FIG. 5, a mode of exploitating the voltage information $V_{di}$ by the computer 7 is given by a 10-wheel system (i=1 to 10).

The ten amplifiers ($6_i$) (i=1 to 10) transmitting the voltage information ($V_{di}$) (i=1 to 10) representative of the pressure of the corresponding tyre are connected to ten devices ($72_i$) (i=1 to 10) for displaying the absolute measurement of each tyre via 10 switches ($71_i$) (i=1 to 10).

A device for measuring the differential pressure enables the computer 7 to effect measurement of the pressure of the wheels two by two. Thus, the measurement of the voltage $V_{d1}$ (or $V_{d2}$) after amplification by means of amplifier $6_1$ is applied to the negative input of the amplifier $74_{1-2}$ (or $74_{2-1}$) mounted as a differential pressure comparator. The direct input (+) of the comparator $74_{1-2}$ (or $74_{2-1}$) receives the signal $V_{d2}$ (or $V_{d1}$); each comparator $74_{1-2}$ and $74_{2-1}$ compares the signal $V_{d1}$ with the signal $V_{d2}$ and delivers a positive signal when the pressure of the tyre of one wheel is greater than that of the other. For example, the comparator $74_{1-2}$ delivers a positive signal when the differential pressure between the tyre of wheel 2 and that of wheel 1 is positive.

This eventuality is inherent either in an increase in pressure in the wheel 2, or more probably in a drop in pressure in wheel 1.

As the volume $V_{di}$ is a linear function of the pressure, the differential voltage is also linearly linked with the under-pressure of one wheel with respect to the other. In the same way, the other wheels are associated in two's, the differential pressure of wheel3 is compared with that of wheel 4, and so on, the comparators $74_{i-j}$ and $74_{j-i}$ for wheels i and j ($1 \leq i,j \leq 10$ for the AIRBUS).

In addition, a device for detecting the drop in absolute pressure is also inserted in the computer 7 of the aircraft. An amplifier $73_1$ mounted as a voltage comparator detects the under-pressure of the wheel 1. To this end, its direct input (+) is taken to a predetermined positive reference potential. Its inverse input (−) receives the signal $V_{d1}$ amplified by the amplifier $6_1$. This voltage comparator $73_1$ delivers a logic zero, as long as the amplified image voltage of $V_{d1}$ remains greater than the reference level or, in other words, as long as the pressure of the wheel 1 remains higher than the predetermined reference threshold. A contrario, the comparator $73_1$ delivers a "drop in absolute pressure" alarm signal in the form of a logic signal "1" when the measurement voltage drops below the reference level. The reference threshold of the comparators $(73)_i$ is adjustable for example between 6.3 bars and 9.8 bars via a potentiometer regulating the voltage of the positive input of this amplifier $(73_i)_{1 \leq i \leq 10}$.

In the same way, a device $(73_i)_{1 \leq i \leq 10}$ for detecting the drop in absolute pressure corresponds at each wheel.

In addition, as the comparator $74_{1-2}$ (or $74_{2-1}$) furnishes a positive analog signal as a function of the difference in pressure between wheel 1 and wheel 2 (or between wheel 2 and wheel 1), this pressure decrease information of one wheel with respect to the other is used according to the invention. In fact, the outputs of the comparators $74_{1-2}$ and $74_{2-1}$ are respectively connected to the direct inputs (+) of two voltage comparators $75_{1-2}$ and $75_{2-1}$. The inverse inputs (−) of these two comparators are taken to a positive potential corresponding to that delivered by the comparators $74_{1-2}$ and $74_{2-1}$. These differential pressure detection levels are adjusted via potentiometers fixing the thresholds levels of the inverse input (−) of the comparators $75_{1-2}$ and $75_{2-1}$. These comparators $75_{1-2}$ and $75_{2-1}$ thus respectively detect the differential under-pressures of the wheels 1 and 2 and furnish at the output a logic signal "1" when the differential pressure affecting the monitored wheel 1 and 2 respectively reaches or is lower than the reference value indicating a deflation.

The two logic pressure drop signals issuing from the comparators $73_1$ and $74_{1-2}$ detecting respectively the absolute under-pressure and the differential under-pressure affecting wheel No. 1 are added in an OR circuit $76_1$ and transmitted to a general summation circuit 78 via a switch $77_{1-2}$.

In the same way for wheel No. 2, an OR circuit $76_2$ adds the absolute under-pressure signal issuing from the comparator $73_2$ to the differential under-pressure issuing from the comparator $75_{2-1}$ and furnishes it at the input of the summation circuit 78.

Each wheel furnishes at the input of the circuit 78 a signal indicative of the drop in pressure which may actuate a breakdown-indicating device.

However, in order to avoid untimely alerts, a device 8, detecting the oscillation frequency $\omega_M/2\pi$ of the self-oscillator 4, is inserted in the cockpit for each wheel.

Referring to FIG. 1, the detector 8 receives at its input the signal $V_s$, issuing from the oscillator 4 and furnishes at the output a signal $V_{a1}$ indicative of the frequency $\omega_{M1}$. A summation circuit 79 receives all the signals $V_{ai}$ from the different wheels and the resultant signal is applied to the inverse input (−) of an amplifier 80. The direct input (+) of the amplifier 80 receives a suitably chosen fixed voltage $V_\alpha$.

When the tyre pressure information $V_{ai}$ issuing from the ten wheels of the aircraft are correctly transmitted and detected, the frequency detectors $(8_i)_{1 \leq i \leq 10}$ each furnish a maximum voltage $V_{ai}$ and the voltage obtained at the output of the summation circuit 79 is maximum. The logic signal obtained at the output of the amplifier 80, mounted as a flip-flop is therefore a 0 in normal operation. The fixed potential $V_\alpha$ represents about 0.85 times the maximum voltage obtained at the output of the summation circuit 79. Thus, if a failure by cut-off or short circuit affects the outer members associated with one wheel only, the output signal of the amplifier 80 will not be modified as the potential on the inverse input (−) is higher than that of $V_\alpha$ on the direct input (+).

On the contrary, if two or more links are cut, the voltage $V_\alpha$ becomes higher than that obtained at the output of the circuit 79 and the amplifier 80 furnishes at the output a logic "1" representative of a "beam cut-off" alarm signal. This alarm therefore appears when at least two failures affecting two different wheels occur, whatever the types of failure.

Monitoring of the outer members is further completed by the recognition of the frequency $\omega_{Mi}/2\pi$ of the oscillator $4_i$ in question.

In fact, the oscillation frequency detectors $8_i$ recognize whether the frequency $\omega_{Mi}/2\pi$ detected is included in the frequency band of measurements allowed. This avoids untimely alerts. To this end, the detectors $8_i$ are each formed by a frequency-sensitive switch, furnishing a zero signal for any frequency less than or higher than a range of frequencies $(F_1, F_2)$, $F_1$ and $F_2$ being the two limiting switching frequencies.

Such a switching circuit is well known to the man skilled in the art and is obtained by adding two resistors and two capacitors.

Such a detector $8_i$ has an exceptional immunity to triggering upon a random signal or a noise signal.

Each detector $8_i$ controls alarm switches $71_i$ and $77_{i-j}$ through which the signals measuring absolute pressure and drop in pressure of this wheel respectively transit. If the frequency $\omega_M/2\pi$ is within the range provided, i.e. if the outer members are neither short-circuited nor cut-off, and if this frequency $\omega_M/2\pi$ is sufficiently stable during the sampling duration, the switches $71_i$ and $77_{i-j}$ will receive their "normally closed" state control, i.e. a logic "1".

In the contrary case, the switches $71_i$ and $77_{i-j}$ will receive a logic "0" from the detector $8_i$ which will maintain them open, this corresponding to an alarm blocking the transmission of the pressure and pressure drop measuring signals of wheel No. i.

However, such an eventuality on wheel No. i does not change the measurement of the other wheels.

Other automatic test and display devices may be inserted in the cockpit from the signals described in the present Application to ensure perfect operating safety.

In particular, odd and even wheels symmetrically located on the same axis are associated for the measurement of differential pressure and for measurement of pressure drop.

In addition, a multiplexing of the ten measurement signals allows rapid read-out of all the pressures of the wheels of the aircraft.

What is claimed is:

1. A device for measuring the pressure of a tyre of a wheel of an aircraft landing gear, comprising a high frequency transformer having a primary winding concentric with respect to and mechanically fast with the wheel and a secondary winding concentric with respect to said primary winding and mechanically fast with said landing gear; a passive sensor means operatively connected to said primary winding for linearly converting a variation in pressure in the tyre into an electrical information variation, in situ; means, including said transformer, for conveying the electrical information from said sensor to the cockpit of said aircraft, a self-oscillator having an input operatively connected to said secondary winding, the oscillation frequency of said self-oscillator being controlled by the value of said electrical information from said sensor; and means for converting the signal issuing from said self-oscillator into a D.C. voltage proportional to a frequency variation being proportional to said variation in pressure; the electrical information from said sensor, before transmission to said cockpit, being applied to said primary winding; the electrical information from said sensor being modified according to the square of the ratio n of transformation between the primary winding and the secondary windings.

2. The device of claim 1, wherein the signal issuing from said self-oscillator serves as reference oscillator, for a second oscillator servo-controlled in phase and in frequency, the voltage of said second oscillator being controlled by the signal issuing from a phase comparator, said phase comparator being excited by the signals issuing from said first and second oscillators.

3. The device of claim 1, wherein said transformer comprises two concentric windings, one being stationary, the other rotating about the axis of the first, said windings being maintained by means of quasi-cylindrical shells made of non-magnetic material, the mobile shell being maintained in contact against the stationary shell by bearing means, said shells having a very low inertia, electrical wires connected to the terminals of said windings, said wires transmitting a signal having a ratio of transformation $n^2$ representative of the ratio n of said windings.

* * * * *